Feb. 6, 1968  A. G. BODINE  3,367,716
SONIC RECTIFIER COUPLING FOR ROCK CUTTING APPARATUS
Filed March 31, 1967  8 Sheets-Sheet 2

INVENTOR.
Albert G. Bodine
By Edward A. Sokolski
Attorney

Feb. 6, 1968　　　　　　A. G. BODINE　　　　　3,367,716
SONIC RECTIFIER COUPLING FOR ROCK CUTTING APPARATUS
Filed March 31, 1967　　　　　　　　　　　　　8 Sheets-Sheet 3

INVENTOR.
Albert G. Bodine
BY Edward A. Sokolski
Attorney

Feb. 6, 1968  A. G. BODINE  3,367,716
SONIC RECTIFIER COUPLING FOR ROCK CUTTING APPARATUS
Filed March 31, 1967  8 Sheets-Sheet 4

INVENTOR.
Albert G. Bodine
BY Edward A. Sokolski
Attorney

United States Patent Office 3,367,716
Patented Feb. 6, 1968

3,367,716
SONIC RECTIFIER COUPLING FOR
ROCK CUTTING APPARATUS
Albert G. Bodine, 7877 Woodley Ave.,
Van Nuys, Calif. 91403
Continuation-in-part of application Ser. No. 402,136,
Oct. 7, 1964. This application Mar. 31, 1967, Ser.
No. 627,390
20 Claims. (Cl. 299—14)

ABSTRACT OF THE DISCLOSURE

The sonic energy output of a sonic generator is coupled to a resonant vibration system. The output of the resonant vibration system is in turn coupled through a sonic rectifier device to a cutting bit which is biased against a rock formation to be planed. The sonic rectifier provides unidirectional high-level pulses of energy to the cutting bit causing such bit to be driven in one direction only in a pulsating manner at the sonic drive frequency.

Specification

This application is a continuation in part of my application Ser. No. 402,136, filed Oct. 7, 1964, and now Patent No. 3,336,082, for Method and Apparatus for Ripping Rock.

This invention relates to a method and apparatus utilizing sonic energy for cutting rock formations, more particularly to such a method and apparatus suitable for use in earth moving operations, quarrying, surface mining and the like.

In the aforementioned copending application, and in my Patent No. 3,033,543, vehicle supported devices for ripping or planing rock surfaces in earth moving and surface mining operations respectively, are described. In the systems of this aforementioned application and patent, elastic resonant vibration systems are utilized, the outputs of which are coupled to cutting bit members which are biased against the rock formation to be cut.

It has been found in these types of operations that if the cutting bit is kept horizontal, then due to the reactive force presented by the rock material above the bit and that below it the bit tends to work out of the rock as it is moved forwardly, thus hampering the cutting operation. In an attempt to alleviate this problem, downward bias is placed on the bit, or the bit is angled downwardly at an oblique angle. Though this greatly diminishes the problem of the bit working out of the rock, it has been found that in some rock material it results in very heavy wear on the bit surfaces and severe overheating thereof as the bit is vibrated to and fro on the rock surfaces. This wear in particular rock formations is so severe that a bit is often ruined in a relatively short period of time. The technique and apparatus of this invention effectively alleviate this wear problem, greatly extending the life of the bit, at the same time attaining highly efficient cutting action. This significant improvement is achieved with the technique and apparatus of this invention by utilizing an acoustic rectifier for coupling the sonic energy from the resonant vibration system to the cutting bit. The term "rectifier" is used herein to means a device which passes vibrational energy in one direction only and thus is analogous to an electronic rectifier which converts AC to DC. This acoustic rectifier couples short unidirectional pulses of sonic energy at the sonic frequency to the cutting bit during a portion only of each vibration cycle. The bit moves only in one direction, therefore back and forth sliding against the rock surfaces, which was primarily responsible for the high wear rate in the aforementioned devices, is eliminated.

The acoustic rectifier may be in the form of a coupling between the bit member and the resonant vibration member which provides tight coupling for vibratory excursions in the direction of desired bit travel and provides little or no coupling for the opposite half of the vibration cycle. Biasing in the form of spring loading is provided in certain of the embodiments of the invention to achieve the desired coupling between the bit member and the resonant vibration member, while in other embodiment such coupling is achieved without such spring loading. In all instances, however, the bit receives sonic driving impulses in a single direction during only a portion of the vibration cycle and is uncoupled from the sonic vibration system during the remainder of the cycle.

It is therefore an object of this invention to provide means for alleviating the wear and overheating of cutting bits in sonic rock cutting operations.

It is a further object of this invention to provide an improved technique utilizing sonic energy for cutting rock formations.

It is still another object of this invention to provide means for acoustically rectifying vibrational energy fed from a sonic vibration system to a cutting member.

Other objects of this invention will become apparent from the following description taken in connection with the accompanying drawings, of which:

FIG. 8 is an elevational view of an embodiment of the device of the invention as incorporated into a tractor for use in earth moving and the like;

FIG. 8a is a view of the coupler member of the embodiment of FIG. 8 in the uncoupled position.

FIG. 9 is a cross-sectional view taken along the plane indicated by 9—9 in FIG. 8;

FIG. 10 is an elevational view partially in cross-section showing a further embodiment of the device of the invention as incorporated into a tractor;

FIG. 11 is a cross-sectional view taken along the plane indicated by 11—11 in FIG. 10;

To facilitate the comprehension of the problem involved and the techniques utilized in the device of the invention to overcome same, it is helpful to analogize the acoustically vibrating circuit involved to an equivalent electrical circuit. This type of analogy is well known to those skilled in the art and is described, for example, in Chapter 2 of "Sonics" by Hueter and Bolt, published in 1955 by John Wiley and Sons. In such an analogy, force F is equated with electrical voltage E; velocity of vibration $u$ is equated with electrical current $i$; mechanical compliance $C_m$ is equated with electrical capacitance $C_e$; mass M is equated with electrical inductance L; mechanical resistance (friction) $R_m$ is equated with electrical resistance R; and mechanical impedance $Z_m$ is equated with electrical impedance $Z_e$. Thus, it can be shown that if a member is elastically vibrated by means of an acoustical sinusoidal force $F_0 \sin \omega t$, $\omega$ being equal to $2\pi$ times the frequency of vibration, that $$Z_m = R_m + j\left(\omega M - \frac{1}{\omega C_m}\right) = \frac{F_0 \sin \omega t}{u} \quad (1)$$

Where $\omega M$ is equal to $$\frac{1}{\omega C_m}$$

a resonant condition exists, and the effective mechanical impedance $Z_m$ is equal to the mechanical resistance $R_m$, reactive impedance components $\omega M$ and $$\frac{1}{\omega C_m}$$

cancelling each other out. Under such a resonant condition, velocity of vibration $u$ is at a maximum, effective power factor is unity, and energy is most efficiently delivered to a load to which the resonant system may be coupled. It is such a high-efficiency resonant condition that is preferably utilized in the technique and devices of this invention to achieve the desired end results.

Just as in electrical circuitry, maximum acoustical energy can be transferred from one circuit element to another where a good impedance match exists, i.e. where the two elements have like impedances. This fact becomes particularly significant in the technique and apparatus of the instant invention where energy transfer from the bit to the rock formation is necessary to cause the disintegration of such formation. By observation of Equation 1 it can be seen that the impedance $Z_m$ is high where the force $F_0$ is high, and velocity of vibration $u$ is relatively low. Thus, in view of the high impedance characteristics of rock formations, it is desirable that the bit exhibit high impedance characteristics, i.e. that high force conditions exist at this point.

Of particular significance in the instant invention is the attainment of high acoustical "Q" in the bit to markedly increase the efficiency of the vibration thereof and to provide a maximum amount of cyclic energy for the rock cutting operation. As for the equivalent electrical circuit, the "Q" of an acoustically vibrating circuit is defined as the sharpness of resonance thereof and is indicative of the ratio of the energy stored in each vibration cycle to the energy used in each cycle. "Q" is mathematically equated to the ratio between $\omega M$ and $\omega R_m$. In the technique of this invention, the effective "Q" of the acoustical vibration system is maximized to make for highly efficient high-amplitude vibration by providing means for coupling the bit to the vibration system only during a small portion of the vibration cycle, during which time very high-level bursts of energy are transferred to the rock formation. With such a relatively short duty cycle, the ratio of energy stored to energy used and thus the "Q" is kept very high with correspondingly high-level "burst" outputs being afforded.

In considering Equation 1 it should be kept in mind that this equation represents the total effective resistance, mass, and compliance in the acoustically vibrating circuit, and that these parameters are generally distributed throughout the system rather than being lumped in any one component or portion thereof.

It is also to be noted that an orbiting-mass oscillator may be utilized in the device of the invention that automatically adjusts its output frequency to maintain resonance with changes in the characteristics of the load. Thus, in the face of changes in the effective mass and compliance presented by the load, the system automatically is maintained in optimum resonant operation by virtue of the "lock in" characteristics of applicant's unique orbiting-mass oscillator. The vibrational output from such an orbiting-mass oscillator is converted by the resonant motion along a controlled predetermined coherent path to provide maximum output along a desired axis. The orbiting-mass oscillator automatically changes not only its frequency but its phase angle and therefore its power factor with changes in the resistive impedance load to assure optimum efficiency of operation at all times.

Referring now to FIGS. 1–7, a first embodiment of the invention as incorporated into apparatus for surface mining of minerals or the like is illustrated. The vehicle for carrying the cutter member and the sonic generator and its associated vibration system are the same as described in my Patent No. 3,033,543 and therefore will only be described briefly herein, the novel portions of this invention being concerned with the sonic rectifier coupling which is illustrated in detail in FIGS. 4–7.

Figures 1, 3:
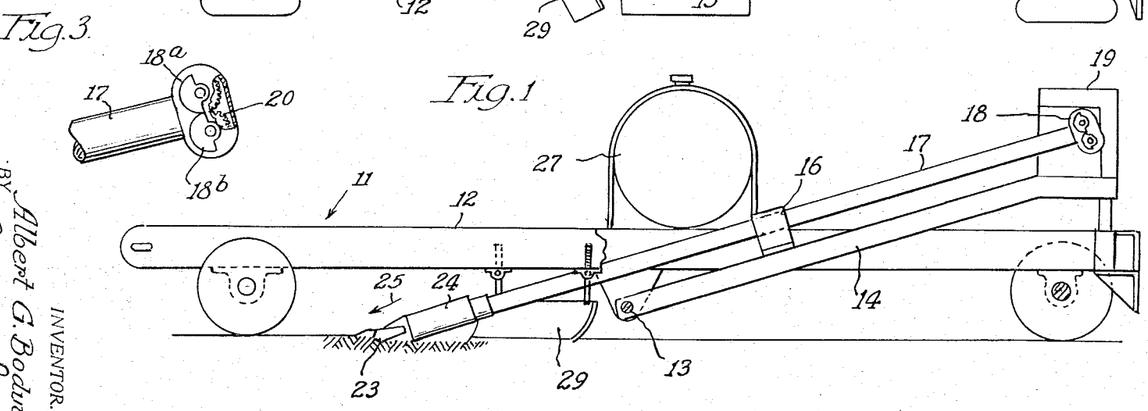
FIG. 1 is an elevational view illustrating a first embodiment of the device of the invention as incorporated into surface mining equipment.
FIG. 3 is a view with partial cutaway section illustrating the oscillator utilized in the embodiment of FIG. 1.
Figure 2:
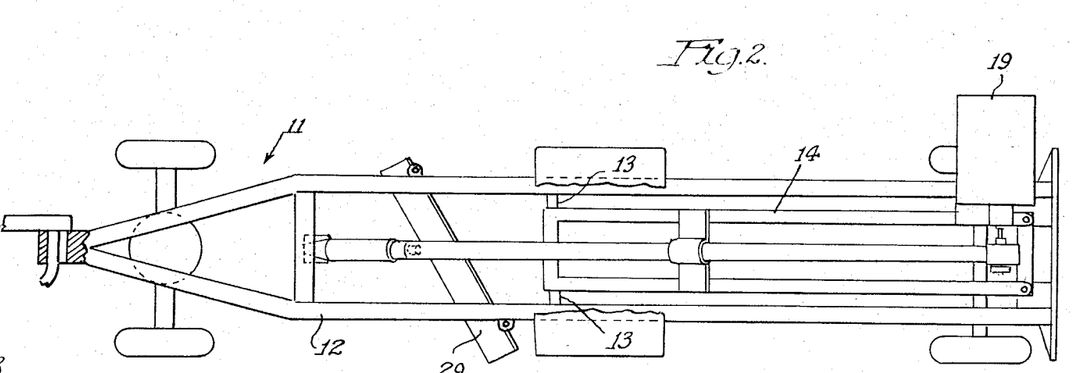
FIG. 2 is a top plan view of the embodiment of FIG. 1.

Transport vehicle 11 which may be self-propelled or either pushed or towed by a motorized vehicle includes a main frame 12 on which sub-frame 14 is pivotally supported on support pins 13. Supported on subframe 14 by means of bracket member 16 is elastic resonator bar 17 which is fabricated of a highly elastic material such as steel. Attached to one end of elastic bar 17 is orbiting-mass oscillator 18 which is rotatably driven by means of gasoline engine 19. Orbiting-mass oscillator 18 as shown more in detail in FIG. 3 comprises a pair of eccentric rotor members 18a and 18b which are driven in opposite directions by means of gear train 20 which is coupled thereto and driven by the drive shaft of engine 19. Rotor members 18a and 18b are phased with respect to each other so that with their rotation, vibrational outputs along the longitudinal axis of resonant bar member 17 are additive while transverse components cancel each other out.

Rotor members 18a and 18b are driven by engine 19 at a rotation speed such as to set up resonant elastic vibration of bar member 17. As to be explained more fully in connection with FIGS. 4–7, the vibrational energy imparted to resonant bar 17 is coupled to cutting bit 23 through coupler member 24 which effectively rectifies the sonic energy providing unidirectional pulses of energy to the bit member in the direction indicated by arrow 25. Tank 27 which is supported on main frame 12 is filled with water to provide a weight to the frame to bias bit 23 against the rock formation to be scraped. A scraper blade 29 is subtended from main frame 12 and operates to move the rock cuttings aside. Orbitting-mass oscillator 18 may be of a more sophisticated type such as described in my Patent No. 3,217,551.

Cutter bit 23 is thus driven in short strokes, which are typically of the order of a fraction of an inch, at the sonic resonant vibration frequency of bar member 17 in the direction indicated by arrow 25.

Referring now to FIGS. 4–7, the sonic rectifier coupling utilized in the embodiment of FIGS. 1–3 to achieve such unidirectional coupling of the vibrational energy is illustrated. Cylindrical coupler member 30 is threadably attached at one end thereof to sonic resonant bar member 17 and at the other end is threadably attached to drive member 31. Coupler member 30 and drive member 31 are slidably mounted in cylindrical jacket 32, lubricant to facilitate the slidable motion of these members being provided through lubrication channels 36 and 37. Jacket member 32 is welded to head member 40 at weld joint 41. Head member 40 is in turn connected to chuck 45 by means of screws 46, cutter bit 23 being a part of chuck 45. A plurality of spring units 50 are arranged circumferentially around the inner wall of jacket 32 and abut at one end thereof on shoulders 52 formed in the inner wall of the jacket and at the other end against recessed portions 30a of coupler member 30.

Figures 4, 5, 6, 6A, 7:
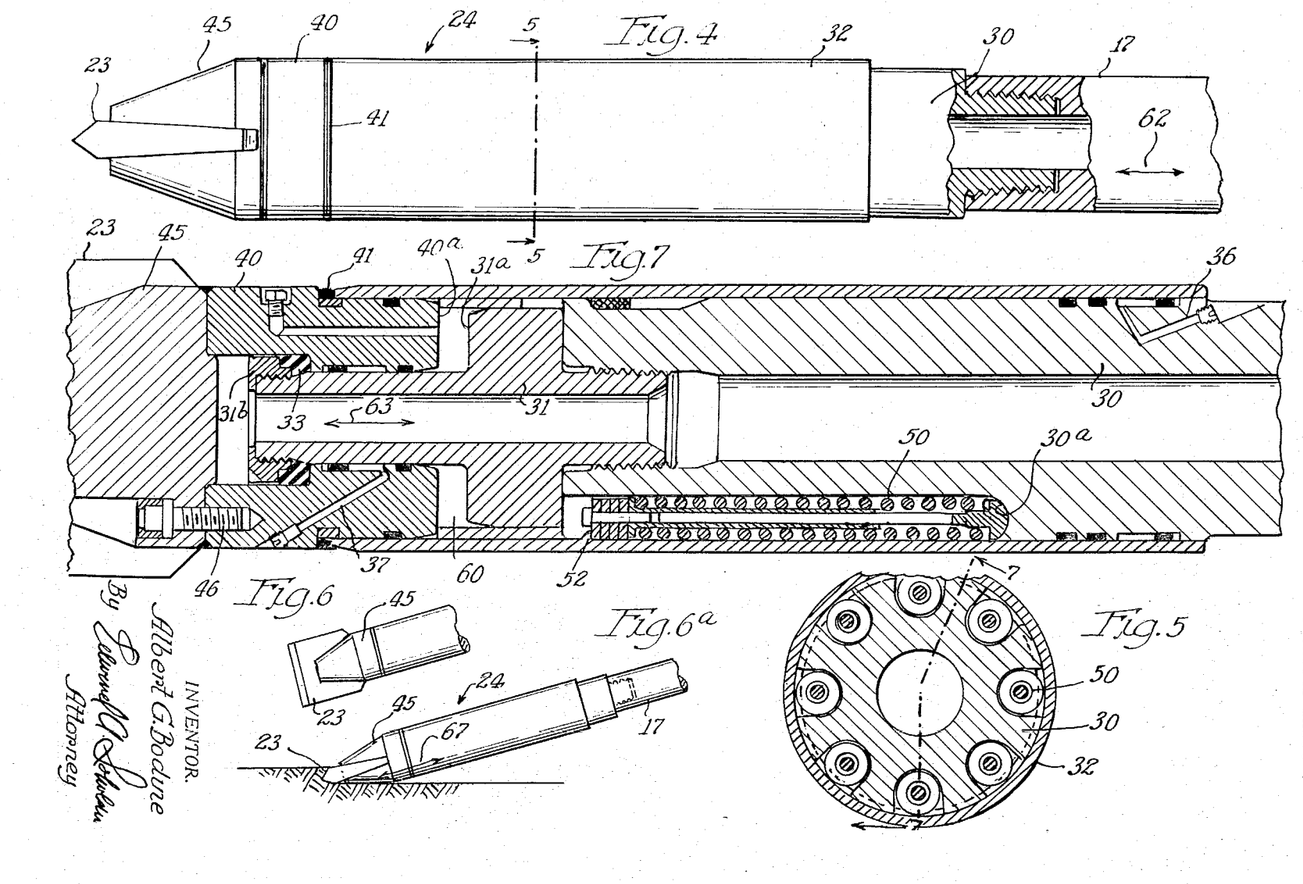
FIG. 4 is an elevational view of the cutting bit and coupler member utilized in the embodiment of FIG. 1.
FIG. 5 is a cross-sectional view taken along the plane indicated by 5—5 in FIG. 4.
FIG. 6 is a top plan view illustrating the cutter bit and coupler member of the embodiment of FIG. 1.
FIG. 6a is a side elevational view of the cutter bit and the coupler member of the embodiment of FIG. 1.
FIG. 7 is a cross-sectional view taken along the plane indicated by 7—7 in FIG. 5.

Spring units 50 urge jacket 32 as well as head member 40, chuck 45 and cutter bit 23 which are connected thereto away from coupler member 30 and drive member 31 with cap portion 31b of the drive member abutting against resilient stop member 33. This tends to provide a gap 60 between drive member 31 and head member 40, which gap is thus maintained even though bit 23 is pressed against the rock. With the vibrational excitation of bar member 17 the bar member is elastically vibrated in the directions indicated by arrow 62 (FIG. 4). This longitudinal vibration is coupled through coupler member 30 to drive member 31 to produce a longitudinal vibration thereof as indicated by arrow 63 (FIG. 5). During the forward excursion of such vibration, i.e. the vibrational movement towards head portion 40, surface 31a of drive member 31 strikes sharply against surface 40a of head portion 40 driving cutting bit 23 forward against the rock structure, such structure being cut with a high force impulse. During the remaining portions of the vibration cycle head portion 40, chuck 45 and the cutting bit 23 are effectively uncoupled from drive member 31 and thus the bit is not dragged backwardly across the rock surface but rather only moves forwardly in response to short, high-impulse strokes as indicated in FIG. 6a by arrow 67. Thus, extremely high-level unidirectional sonic frequency energy pulses are provided during a relatively short portion of the total vibration cycle, this short duty cycle making for very high "Q" operation.

Figures 8, 8A, 9, 10, 11:
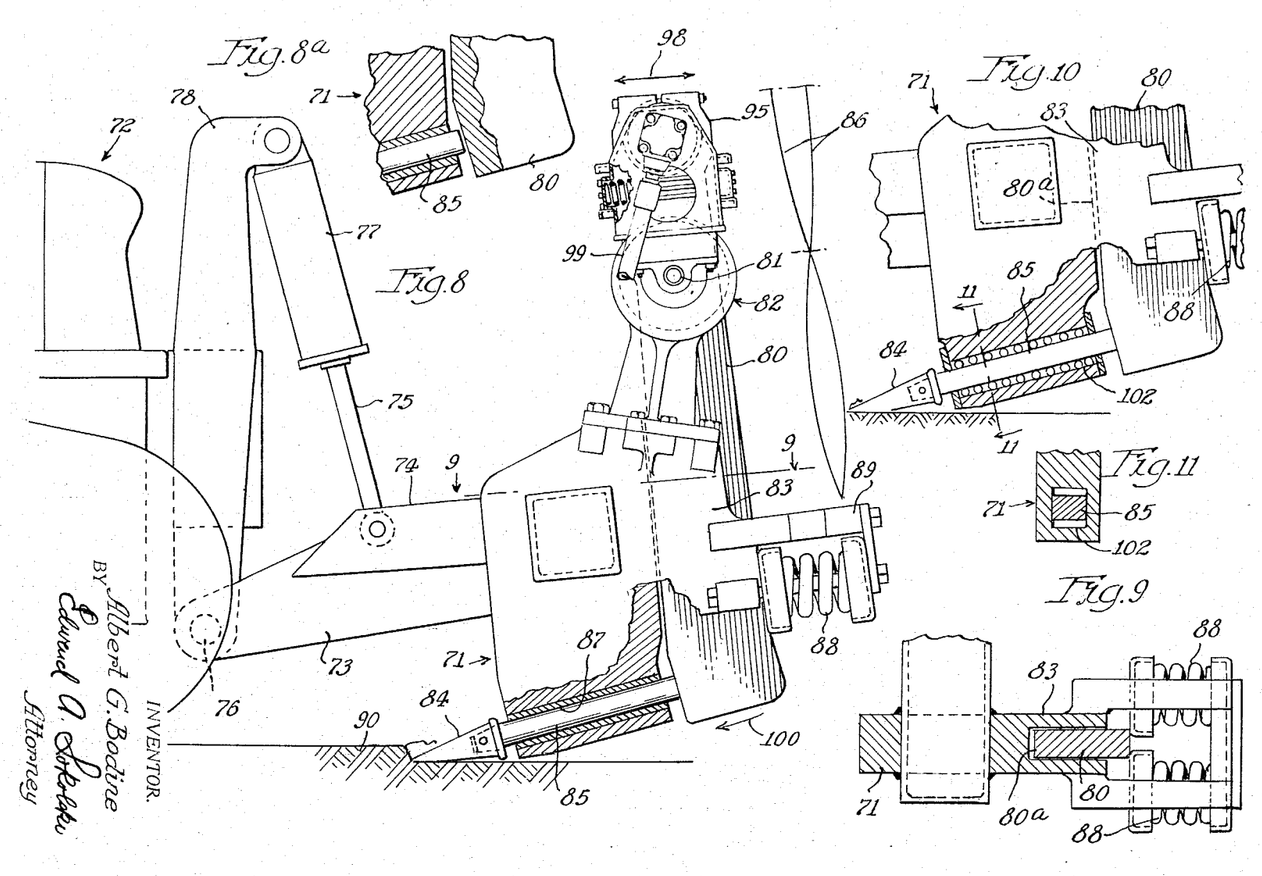

Referring now to FIGS. 8, 8a and 9, a second embodiment of the device of the invention is shown as incorporated into a tractor adapted for ripping rock. The equipment shown other than for the rectifier coupling is fully described in the aforementioned application Ser. No. 402,136, of which this application is a continuation in part, and therefore will be described but briefly herein.

Support frame 71 is supported on the rear of tractor 72 by means of pivotally mounted arm members 73 and 74. Arm member 73 is pivotally supported on the tractor at pivot point 76 while arm member 74 is pivotally attached to the end of shaft 75 of hydraulic cylinder 77. Hydraulic cylinder 77 is attached to the top end of bracket arm 78 and is used to lift frame 71 to an elevated carrying position or to drop it to the operating position as shown in FIG. 8.

Resonator bar member 80, which is preferably fabricated of an elastic material such as steel, is pivotally supported on pin member 81 which is contained within pivotal support unit 82. Vibrational isolators are provided within support unit 82 to provide vibrational isolation between bar member 80 and frame 71. Frame 71 has a forked portion 83 which provides a guide for bar member 80. Bar member 80 is thus supported for pivotal motion about the longitudinal axis of pin member 81.

Cutter bit 84 is attached to shaft 85 which is slidably mounted in sleeve bearing 87 formed in frame 71. Bar member 80 is urged against the end of shaft 85 by spring assembly 88 which is attached at one end thereof to frame 71 by means of bracket 89, the other end of the spring assembly abutting against bar member 80. With tractor 72 moving forward and cutter bit 84 in engagement with rock formation 90, the rear end of shaft member 85 forces the end surface 80a of the bar member away from the opposing surface of forked portion 83 of the frame (as shown in FIGS. 8 and 9).

Supported on the top portion of frame 71 is an orbiting-mass oscillator 95 which includes a rotor oriented so as to generate vibrational energy in the directions indicated by arrows 98. The casing of orbiting-mass oscillator 95 is tightly attached to the end of bar member 80 thereby transferring the vibrational output of the oscillator to the bar member and setting up transverse vibrations therein in the directions indicated by arrows 98. The rotor of oscillator 95 is shaft-driven by a hydraulic motor driven by hydraulic line 99. The speed of rotation of the rotor of oscillator 95 is adjusted so as to cause transverse resonant vibration of bar member 80 to set up standing waves therein as indicated by graph lines 86. Oscillator 95 may be one of the types described in my Patent Nos. 2,960,314 or 3,217,551. The vibratory excursions of bar member 80 in the direction indicated by arrow 100 provide sharp driving impulses against shaft 85 which are transferred to cutting bit 84. During the opposite half of the vibration cycle, however, bar member 80 is effectively uncoupled from shaft 85 as it moves away from the end of the shaft as shown in FIG. 8a. In this manner sonic rectification is effectively achieved and bit 84 receives unidirectional impulses at the sonic resonant vibration frequency of bar member 80.

Referring now to FIGS. 10 and 11, an embodiment of the invention closely similar to that just described is illustrated. In this embodiment, shaft member 85 is rectangular in configuration and rather than being supported in a sleeve bearing as for the previous embodiment, is supported on roller bearings 102 which are retained in frame 71, in this manner facilitating the motion of the shaft in response to the vibrational drive impulses.

Figures 12, 14:
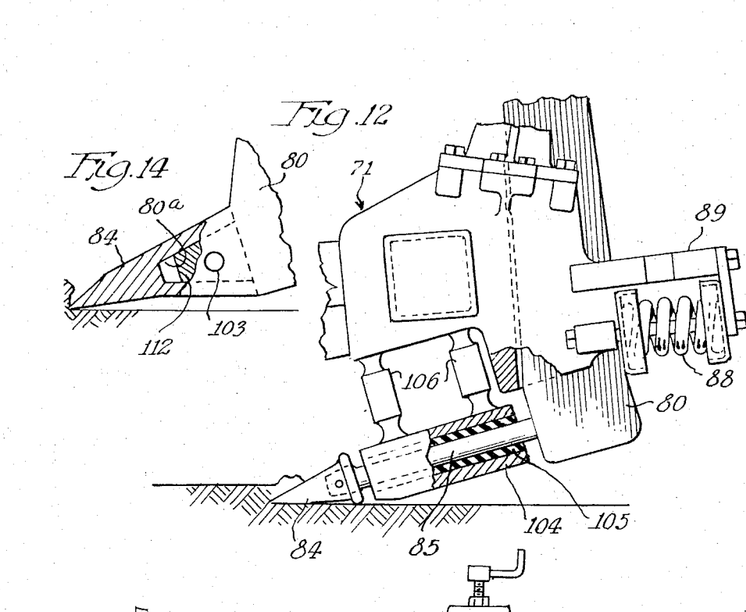
FIG. 12 is an elevational view partially in cross-section of another embodiment of the rectifier device of the invention as incorporated into a tractor.
FIG. 14 is an elevational view partially in cross-section of a further embodiment of the rectifier device of the invention as incorporated into a tractor.

Referring now to FIG. 12, an additional embodiment of the invention closely similar to the embodiment of FIG. 8 is illustrated. Here again, the structure is identical except for the mechanization of the rectifier coupling. In this embodiment shaft member 85 is held in sleeve member 104 by means of rubber bushing 105, to permit longitudinal freedom for shaft 85. Sleeve member 104 may also be suspended from frame 71 on elastic pillars 106. Pillars 106 which may be fabricated at least partially of rubber, have transverse elasticity so that sleeve member 104 will readily permit shaft 85 to move forward when it receives vibrational impulses from bar member 80.

Figure 13:
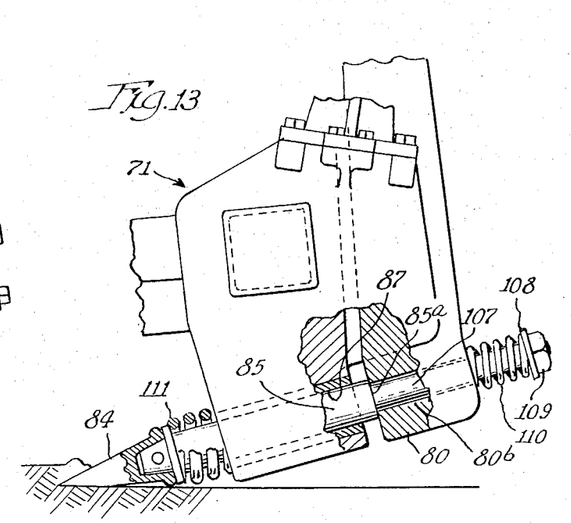
FIG. 13 is an elevational view partially in cross-section of still another embodiment of the rectifier device of the invention as incorporated into a tractor.

Referring now to FIG. 13, an additional version of a sonic rectifier coupler which may be utilized in the tractor mechanism of FIG. 8 is illustrated. In this embodiment, shaft 85 is slidably mounted in sleeve 87 formed in frame 71. Fixedly attached to the end of shaft 85 or integrally formed therewith, is an extension member 107 of a reduced diameter which slidably fits through an aperture 80b formed in bar member 80. Shaft extension 107 has a washer 108 held at the end thereof by nut 109 which threadably engages the end of the shaft extension. Spring 110 is held between washer 108 and bar member 80 and thus urges bar member 80 against shoulder 85a on the end of shaft 85. Heavy spring 111 is located between cutter bit 84 and frame 71 to maintain these two members spaced from each other. In this manner bar member 80 is resiliently biased a constant predetermined amount against shaft 85, and again so that the vibrational excursions in the direction of cutting bit 84 are transmitted to the bit, while the shaft is uncoupled from the vibration system during the reverse excursions.

Referring now to FIG. 14, another embodiment of the rectifier coupler as incorporated with the tractor mechanism of FIG. 8 is shown. This embodiment is disclosed in the aforementioned application Ser. No. 402,136, of which the instant application is a continuation in part.

In this embodiment cutting bit 84 has a socket 84a which receives a tooth 112 which is welded to bar member 80. Bit 84 is removably attached to tooth 112 by means of removable pin 103.

It has been found that in normal operation, in view of the high accelerations involved, the holding action of pin 103 is inherently loose so that during the vibrational excursions of bar member 80 away from the bit there is very little coupling between the two, while for vibrational excursions toward the bit, i.e. with such bit being driven into the rock formation, tight coupling exists thus providing the desired unidirectional driving action. This embodiment, while less efficient in its rectification than the other embodiments described thus provides the same general type of rectifier action.

Figure 15:
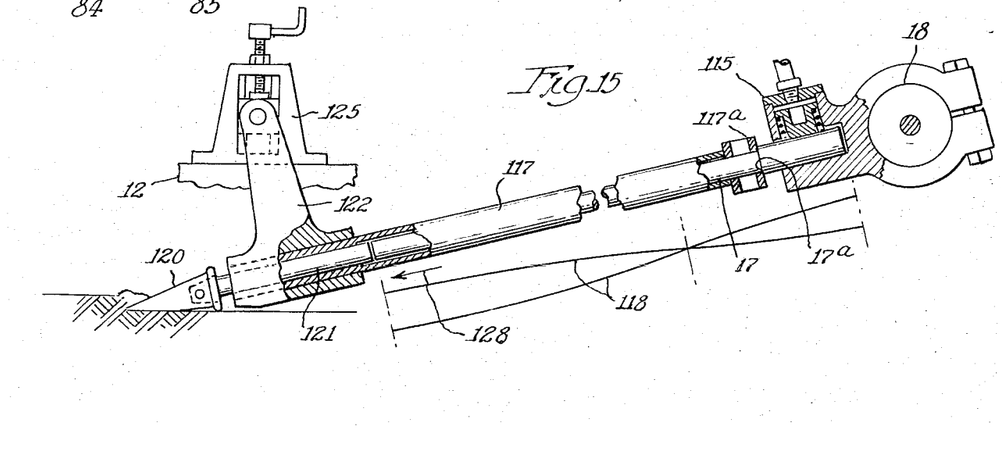
FIG. 15 is an elevational view partially in cross-section of another embodiment of the rectifier device of the invention suitable for utilization in an earth scraping device such as illustrated in FIG. 1.

Referring now to FIG. 15, an embodiment of the device of the invention suitable for utilization with the surface mining device illustrated in FIGS. 1 and 2 is illustrated. This particular embodiment differs from all of those described thus far in that no spring biasing is utilized for coupling the rectifier coupler to the sonic vibration system. The same numerals are utilized in FIG. 15 to identify corresponding components shown in FIGS. 1 and 2. Resonator bar member 17 is clamped to the housing of orbiting-mass oscillator 18 by means of hydraulically actuated clamp 115. Bar member 17 is slidably supported within tube member 117, a shoulder 17a being formed in the bar member which abuts against the flanged end portion 117a of the tube member. The shaft 121 to which cutter bit 120 is attached is slidably mounted in tube member 117. Tube member 117 is supported on the frame 12 of the vehicle carrying the apparatus by means of bracket member 122 which is clamped to the tube member at one end and pivotally supported on jack member 125 at the other end thereof. Jack member 125 may be utilized to adjust the vertical position of cutting bit 120 for either operation or carrying.

When vehicle frame 12 is moved forwardly, cutting bit 120 engages the rock formation and its shaft 121 is moved to force the opposing surfaces of shaft 121 and bar member 17 into abutment with each other. With the resonant longitudinal vibration of bar member 17, as indicated by graph lines 118, by virtue of the vibrational output of oscillator 18, cutter bit 120 receives unidirectional vibrational pulses during vibrational excursions in the direction indicated by arrow 128 but is uncoupled from the vibrating system for opposite vibrational excursions. In this manner the desired rectification is achieved.

Because of the basic differences of this invention from the various types of hammer-chisel rock cutters, it is important to recognize the special features of the acoustic rectifier. To facilitate the understanding of this rectifier operation, reference is now made to FIGS. 16 and 17 which graphically illustrate the rectifier action.

Figure 16:
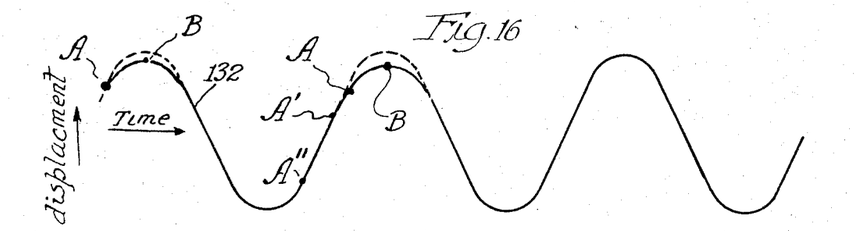
FIGS. 16 and 17 are sine wave graphs illustrating the operation of various embodiments of the invention.

In FIG. 16 sine wave graph 132 indicates the vibrational drive wherein the horizontal axis represents time, and the vertical axis represents displacement. Here the arrow 133 indicated for displacement is in the direction of the cutting action of the bit. It is of course to be recognized that the sine wave representation of displacement versus time is for a point on the resonant member, in the region where the resonant drive member makes rectifying contact with the bit member. Therefore, the sine wave graph 132 illustrates vibration excursion versus time, with the upward slope of the sine wave representing motion toward the rock, and the downward slope of the sine wave representing motion away from the direction of cutting. In the first loop of curve 132 we note the type of rectifying action identified with the embodiment of FIG. 13. The dotted portions above sine wave graph 132 point up the decrease in peak amplitude or "clipping" caused by the acoustic coupling, the solid portions therebelow indicating the "clipped" portions of the wave. In this embodiment, under typical conditions the resonant bar member 80 is acoustically coupled to the shaft member 85 only during a predetermined portion of the acoustic cycle. Point "A" on curve 132 indicates a typical part of the cycle wherein resonant bar member 80 (FIG. 13) contacts shaft member 85. Point "B" indicates the time in the cycle when the resonant member 80 starts to move back or decelerates, and therefore separates from shaft member 85. The important point to note here is that the distance from A to B in effect indicates the degree of acoustic coupling and the length of the coupling cycle. In the embodiment of FIG. 13, this cycle interval tends to be a fixed value. Spring 110 (FIG. 13) provides a substantially fixed coupling bias and this tends to make the interval A–B fairly constant.

Looking at the second loop of curve 132 of FIG. 16 we note that we have an acoustical condition shown which is more typical of the other embodiments of the invention. In these other embodiments of the invention, such as that, for example, of FIG. 15, the amount of bias between the resonant bar member 17 and the shaft member 121, is somewhat automatically variable. This automatic adjustment accomplished in these embodiments of the invention results from the fact that the contact force of the cutter member against the resonant bar member is determined to some degree by the thrust of the vehicle as it progresses forward against the rock. In other words, in harder rock, where the vehicle generates greater thrust, the cutter member is biased against the resonant member with greater acoustic coupling. Then as a soft region in the earth is momentarily encountered, the traction effort of the vehicle momentarily reduces, and the acoustic bias correspondingly reduces. This is represented in FIG. 16, wherein, in the second loop of curve 132, point A′ represents the amount of acoustic rectification bias which occurs when engaging hard rock, and there is high vehicle thrust. Under these conditions of rectification the acoustic coupling extends from point A′ to point B. Where softer rock is encountered, the vehicle thrust, and corresponding acoustical bias, is reduced so that acoustic coupling occurs later in the cycle as indicated by point A. Under these latter conditions of acoustic rectification the acoustic coupling extends from point A to point B, rather than from point A′ to point B, as is the case with harder rock, thus affording a shorter duty cycle.

From the above it can thus be seen that one typical embodiment of this invention of the type shown in FIG. 13 will tend to give a constant degree of acoustic coupling, and a constant degree of rectification. This is especially true if resonant bar member 80 is driven at fairly constant amplitude, so that its acceleration forces stay fairly constant. On the other hand, other embodiments of this invention, such as that of FIG. 15, give a varying degree of acoustic coupling, and acoustic rectification, typically with an automatic result wherein the acoustic coupling increases, and the acoustic rectification decreases, as acoustic bias force increases. In this connection it is noteworthy that as point A′ is made to approach closer to the axis of the sine wave (i.e. half way between the positive and negative peaks) where cyclic velocity is a maximum, the system will tend to generate second harmonic frequencies in the resonant member.

As the acoustic cycle of the resonant member progresses toward point B, the acoustic acceleration attains a very high value, typically one hundred times the acceleration of gravity. This makes the decoupling force greater than the bias force created by the tractive effort of the vehicle. Therefore the decoupling force effectively accomplishes the rectification by stopping, momentarily, the further flow of acoustic energy to the bit. These high acoustic accelerations literally fling the bit unit away from the resonant circuit member, until bias force again equals the decoupling force. Actually the bias force, relative to the acoustic acceleration, will sometimes be low enough so that decoupling, or point B, will occur ahead of the peak of the acoustic wave. Thus it can be seen that the greater the acoustic bias the earlier will be the coupling point and the later will be the decoupling point, within this phase, with a consequent greater portion of the clipped wave being fed to the bit through the rectifier action. Because of the high acoustic "Q" of the resonant member operating in this manner, these clipped waves sent into the earthen material are very intense, and accomplish very effective cutting action.

It will be noted that the output impedance of the clipped wave is still quite high, usually of the order of magnitude of the output impedance of the resonator itself. Moreover, if the vehicle traction bias force, and the vehicle speed or acceleration capabilities are all great enough the coupling point can actually be below the axis as indicated in FIG. 16 by point A″. This means that the bit member is coupled throughout almost a half cycle. It can thus be seen that the special effects here of vehicle propulsion operating in combination with the rectifier bring forth some very significant features of the invention.

Figures 17, 18, 19:
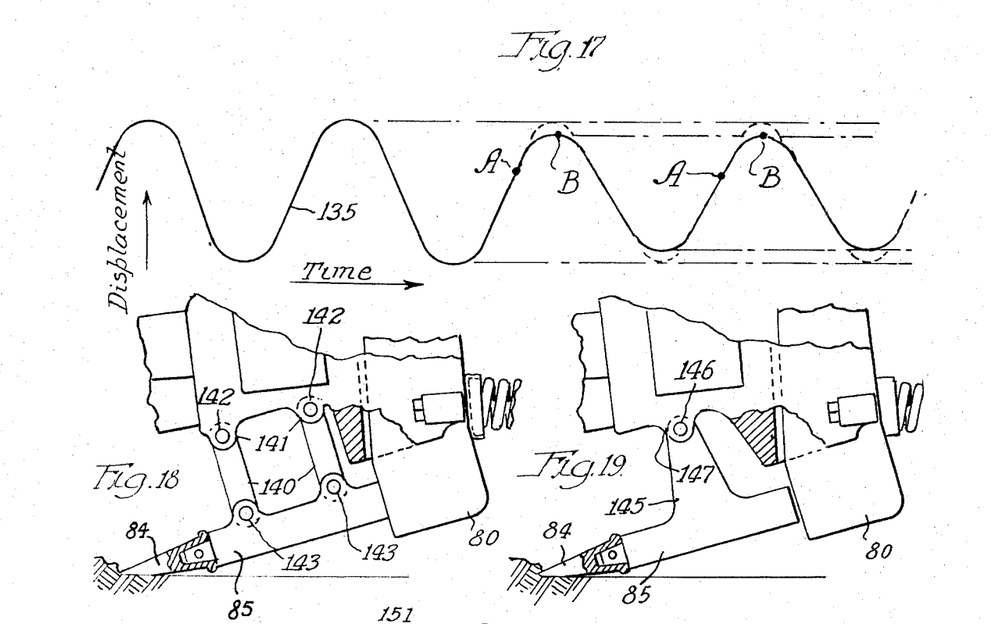
FIG. 18 is an elevational view illustrating another embodiment of the invention suitable for use in a tractor mechanism.
FIG. 19 is an elevational view of a further embodiment of the invention for use with a tractor.

Referring now to FIG. 17 and FIGS. 1-7, various significant factors which can be used to advantage in the operation of the embodiments of the invention shown in FIGS. 1-7 will now be described. In FIG. 17 we note initially in the sine wave pattern 135 a full amplitude vibration of bar 17 (FIG. 1). This condition prevails when the vehicle is cutting through fairly soft formations wherein springs 50 (FIGS. 5 and 7) have sufficient force to hold surfaces 31a and 40a apart. Under these conditions the earthen material is cut by the forward progression of the vehicle. Therefore, under these conditions, resonant member 17 vibrates relatively freely to a large amplitude, giving a high energy storage, with maximum acoustic "Q." As soon as a hard region is engaged, the forward propulsive force of the vehicle pressing bit 23 against the work material will compress springs 50, so that surfaces 31a and 40a become acoustically coupled on each cycle, starting with the first indication of point A on the sine wave pattern. Thereafter, as long as the cutter bit is progressing through hard rock, the wave pattern is like that represented to the right of the first appearance of point A. That is to say, each interval A-B represents the acoustic coupling phase during which energy is extracted from the resonant member by virtue of the acoustic bias coupling.

It can be seen therefore that the acoustic rectifier action leaves the resonant bar uncoupled from the bit member during all portions of the cycle except during the portion A-B, for each and every cycle. Thereafter, as soon as the cutter bit has passed through the hard region, springs 50 expand and completely disengage the rectifier action, so that the system can resonate up to full unloaded amplitude again, and therefore store high energy level for the next duty pulse interval. It will be noted that the embodiment of FIGS. 1-7, as explained by FIG. 17, involves embodiments, plus this duty pulse feature. If desired, the volume between surfaces 31a and 40a (FIG. 7) can be partially filled with liquid, so that rectification is accomplished by liquid cavitation.

Referring now to FIG. 18, a further embodiment of the invention is shown wherein the cutter bit member is carried on shaft 85, the shaft being connected to the vehicle by a pair of link arms 140. This embodiment is somewhat similar to that of FIGS. 8 and 10 and may be utilized with a tractor mechanism such as shown in FIG. 8. Link arms 140 are mounted on the main structure by trunnions 141 which carry bearing pins 142. Likewise the shaft element 85 is mounted to the link arms by bearing pins 143. By use of these bearings, as compared for example with the elastic pillars 106 shown in FIG. 12, I am able to have a well guided shaft member 85 mounted in a system having minimum acoustic damping, and minimum bearing wear, while at the same time eliminating any problems of secondary resonance as might arise with pillars 106 such as shown in FIG. 12. It is noteworthy in connection with the embodiment of FIG. 18 that by use of a pair of links 140, I am able to maintain shaft element 85 at all times parallel to a constant axis line, so that the angle of bit 84 does not change. In actual operation, the action of resonant member 80 against member 85 is very much like that of the embodiments of FIGS. 8 and 10. A considerable advantage over the embodiments of FIGS. 8 and 10, however, is achieved in the reduction in wear and in bearing friction.

FIG. 19 illustrates another form of my invention for use with the tractor mechanism of FIG. 8 wherein basic shaft structure 85 has an arm 145 appended thereto, so as to be carried by bearing pin 146 mounted in trunnion element 147. The embodiment of FIG. 19 has many of the advantages of that shown in FIG. 18, specifically the elimination of secondary resonance, and reduction in bearing loads. The unique feature of FIG. 19 is that shaft element 85 swings in a small arc, as compared with the parallel motion of the shaft element 85 shown in FIG. 18. Such arcuate travel of bit 84 as provided in the embodiment of FIG. 19 sometimes is more effective in cutting certain types of rock where an upward component is an advantage in combination with the forward component of motion.

Figure 20:
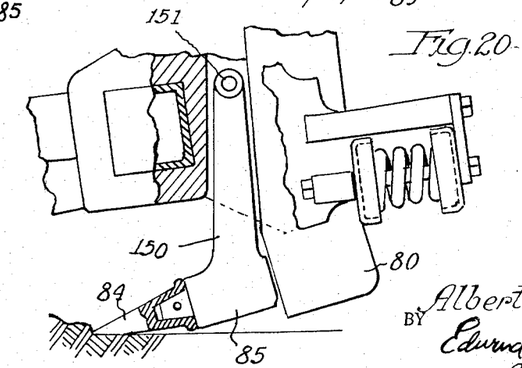
FIG. 20 is an elevational view of still another embodiment of the invention for use with a tractor.

Referring to FIG. 20 we see a form of my invention similar to that of FIG. 19, except that arm 150 is considerably longer than the arm 145 utilized in the embodiment of FIG. 19, so that the radius of the arcuate travel is greatly increased, thus giving a reduced vertical component to the motion of bit 84. In FIG. 20 we note that arm 150 swings about pin 151. This pin 151 has minimum duty here because the arcuate travel is so slight that the bearing motion of the pin is minimized.

My patent application Ser. No. 326,419, filed Nov. 27, 1963, now Patent No. 3,269,039, for a Sonic Earth Moving Machine, issued Aug. 30, 1966, and which was copending with my above mentioned Ser. No. 402,136, shows a power scraper earth mover (sometimes called a carry-all) with sonically driven earth cutter teeth acoustically coupled to a resonant bar.

Figures 21, 21A:
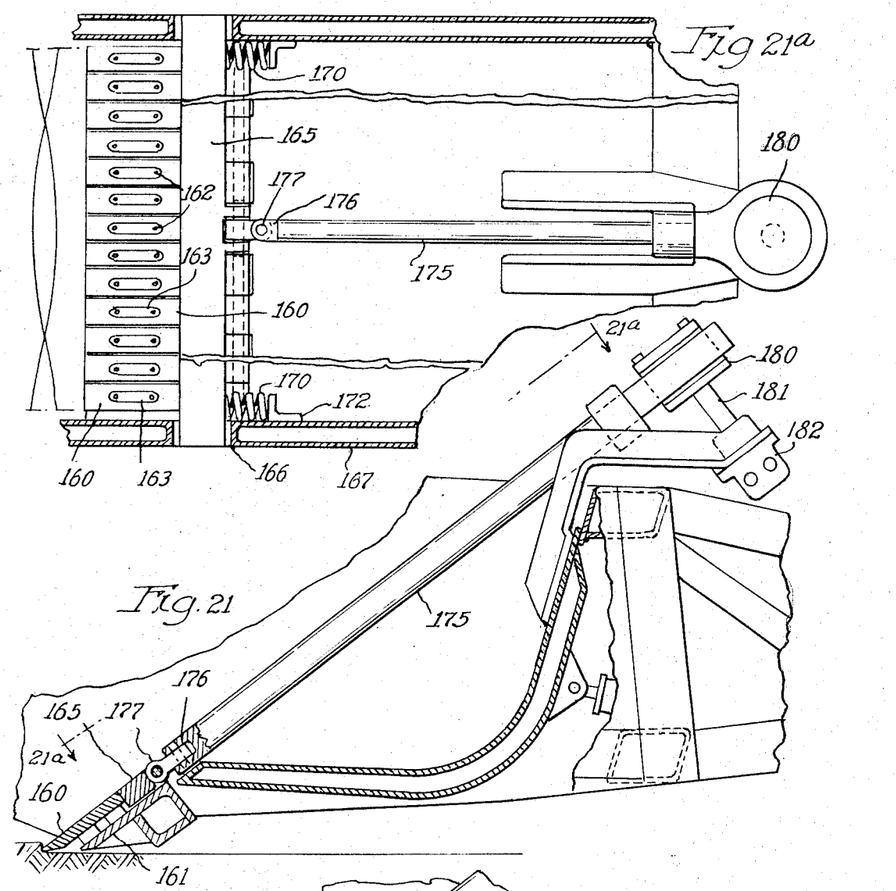
FIGS. 21, 21a and 21b are various views of an embodiment of the invention incorporated into a power scraper earth mover.
Figure 21B:
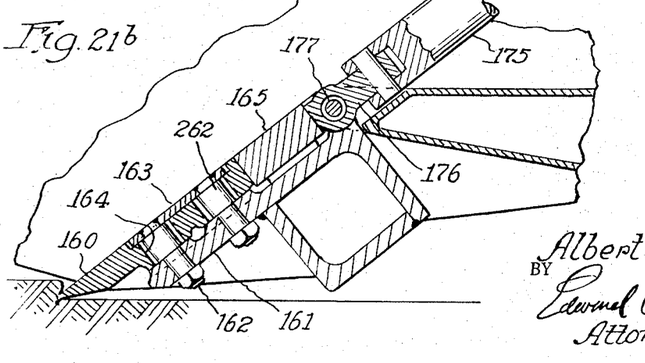

FIGS. 21, 21a and 21b show a power scraper earth mover of the type described in Patent No. 3,269,039 which has substantial rectifier action. Since the basic scraper machine involved is identical to that shown in Patent No. 3,269,039, reference is hereby made to said patent for all pertinent details of the machine not shown herein; and accordingly for convenience FIGS. 21, 21a and 21b are fragmentary views of the scraper showing primarily the novel features of the particular design being considered here. Individual cutter teeth 160 are loosely mounted on basic structural beam 161 by means of pins 162 and a plate 163, for each individual tooth. The clearance freedom is provided by having plate 163 mounted on pins 162 with sufficient clearance so as not to grip the tooth. Moreover the tooth has elongated holes 164, which provide freedom of longitudinal movement of the tooth element, sufficient for the vibratory stroke.

The vibratory stroke of each of the individual teeth is accomplished by sonic power delivered to the individual teeth from lateral resonant bar 165. This lateral resonant bar 165 is positioned by guide openings 166 in the side walls 167 of the scraper body. Moreover, springs 170, backed up by spring brackets 172, bear against the back edge of bar 165, so as to urge the bar against the back of the individual teeth. Therefore the forward progression of the vehicle causes the springs which are mounted against the vehicle body 167 via brackets 172, to deliver the vehicle propulsive force, or bias, against the elastic resonant bar 165. This biasing force then provides the required degree of acoustic coupling of the bar 165 against the back edges of the individual teeth 160. This is where the rectifier action takes place, this by virtue of the fact that the teeth are decoupled from the bar when the bar accelerates back away from the teeth and acoustically coupled thereto as the bar accelerates forward against the back of the cutter teeth.

Resonant bar 165 is driven by coupling bar 175 by means of attachment clevis 176 and pin 177. Bar 175 is driven by oscillator 180, which oscillator is in turn driven by drive shaft 181, receiving power from motor 182. For details of the motor, drive shaft and oscillator reference is again made to above mentioned Patent No. 3,269,039.

Figure 22:
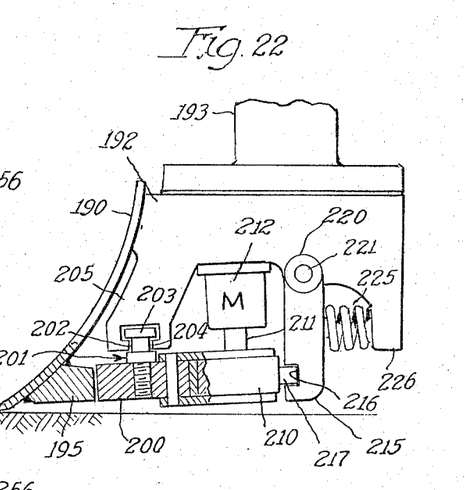
FIG. 22 is an elevational view of an embodiment of the invention as utilized with an earth mover blade.

FIG. 22 shows an embodiment of the invention as applied to an earth mover blade, such as a dozer blade or a road grader blade, for example. The example chosen here is a road grader blade such as is used on conventional long-wheel-base road grader machines for leveling and grading road surfaces. Blade 190 is conventionally mounted via swivel 192 to scraper frame mounting 193. The invention is applied here in a manner to employ the elastic wave transmission properties of the blade itself. For this purpose a series of striker blocks 195 are attached, such as by welding, along the lower back surface of the cutter edge of the blade. Engaging these blocks is resonant bar 200 mounted to the main structure by means of mounting pins 201 having clearance neck 202 and top flange 203, so as to accommodate oversized hole 204 in mounting bracket 205. In this manner, because of the clearance of hole 204, it is possible for resonant bar 200 to develop a lateral mode of vibration, without seriously vibrating the whole machine. It will be appreciated that bar 200 extends along the rear edge of the blade 190 and is coupled thereto by striker blocks 195. Oscillator 210 is bolted to resonant bar 200 as shown. Moreover, oscillator drive shaft 211 and motor 212 as well as oscillator 210 are as shown in above mentioned Patent No. 3,269,039. In this connection it will be noted that motor 212 is mounted to the dozer or grader structure.

As described above, the resonant bar 200 is isolated from the main structure by virtue of the clearance provided in connection with pins 201 and brackets 205. Therefore the bias force for applying the resonant bar 200 against the striker blocks 195 is provided by lever arm 215, working against oscillator 210 by virtue of the engagement of socket 216 and pin 217 which is attached to the oscillator housing. Lever arm 215, which pivots from the main structure by means of trunnion 220 and pin 221, is urged forward by means of spring 225 which abuts against bracket 226 mounted on the swivel structure 192 as shown.

In operation, the motor is driven at a speed which will provide a sonic frequency which resonates elastic bar 200. Elastic bar 200 delivers, by rectifier action through its contact against striker blocks 195, a rectified sonic wave energy which sonically activates blade 190, with a standing wave pattern. It will be seen that here again the primary delivery of sonic energy is rectified so as to be primarily in the direction of cutting action of the blade against the earth.

Figure 23:
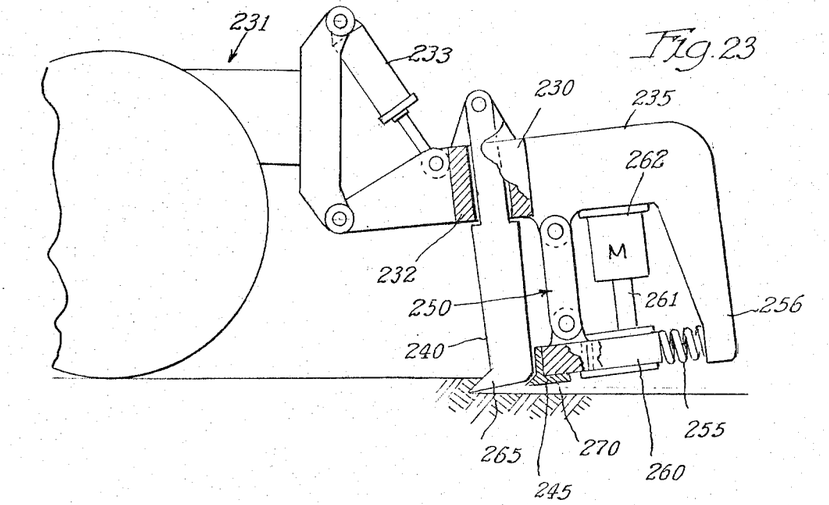
FIGS. 23 and 23a are views of an embodiment of the invention as incorporated into a scarifier mounted on a road grader.
Figure 23A:
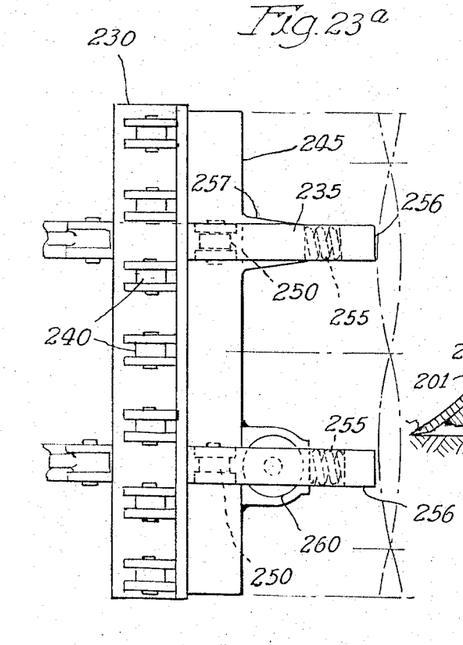

FIGS. 23 and 23a show an embodiment of the invention as applied to a scarifier, typically mounted, as shown, at the back of the frame of a road grader 231. The function of such a tool is to cut grooves in pavement, usually multiple grooves, so as to aid in the cutting of the pavement to a lower grade level, such as for resurfacing. Referring to FIGS. 23 and 23a we note main tool bar 230, having a plurality of socket holes 232 extending therethrough. Tool bar 230 is mounted on the back of the machine by means of mounting arm 235, which mounting arm is hinged and hydraulically controlled in position by means of an hydraulic cylinder 233.

Tool bar 230, with its multiple socket holes 232, provides a mounting for scarifier teeth 240, by permitting these teeth to extend up through the mounting socket holes as shown. In order to provide freedom of vibratory movement these teeth may be mounted with clearance in the socket holes. The multiple cutter teeth are driven by resonant bar 245, somewhat in the manner of the embodiment of FIG. 21 as above described. The resonant bar 245 is suspended and located by means of link arms 250. Moreover, the resonant bar is urged against the back edge of the cutter teeth, for necessary acoustic coupling bias, by means of springs 255, which respectively react between brackets 256 and the casing of oscillator 260 and bracket 257, both of which are attached to bar 245 as shown. Sonic oscillator 260 is attached to the resonant bar as shown, and is driven by motor means 262 through drive shaft 261, as shown. For a detailed description of the oscillator, its drive shaft and the motor means, reference is again directed to Patent No. 3,269,039. Motor 262 is mounted on tool bar 230, as shown.

A significant point to be noted here is that in order to obtain good sonic drive to the individual cutter teeth, the resonant bar 245 is located fairly low, so that the component of its driving force projects as nearly horizontally as possible, in relation to cutter tooth point 265. In order to place the resonant bar as low as possible for this purpose, the resonant bar is so low that it tends to contact the pavement in between the grooves cut by the teeth 240. Therefore, to ease the forward progression of the vehicle an extended lengthwise cutter 270 mounted, such as by silver brazing, on the bottom surface of the resonant bar 245 may be provided. Cutter edge 270 can conveniently be attached to bar 245 by means of silver brazing, so that the heat treatment of the bar 245 is not impaired by the attachment.

In operation the forward progression of the vehicle acoustically couples the resonant bar 245 against the back of teeth 240 by means of force transmitted from spring 255. Springs 255 are in turn forcibly urged by the tractive effort of the vehicle applied through brackets 256. As explained above, the tractive effort of the vehicle therefore provides the acoustic coupling interval of each cycle of the resonant bar 245 against the cutter teeth 240. Moreover, as explained above, rectification occurs during the interval when the backward acceleration of the resonant bar provides a separating force which is greater than the biasing force of spring 255. This results then in the cutter teeth having primarily a forward drive as regards sonic force, by virtue of the clipped wave energy delivered through this rectifier action.

Figures 24, 24A, 24B:
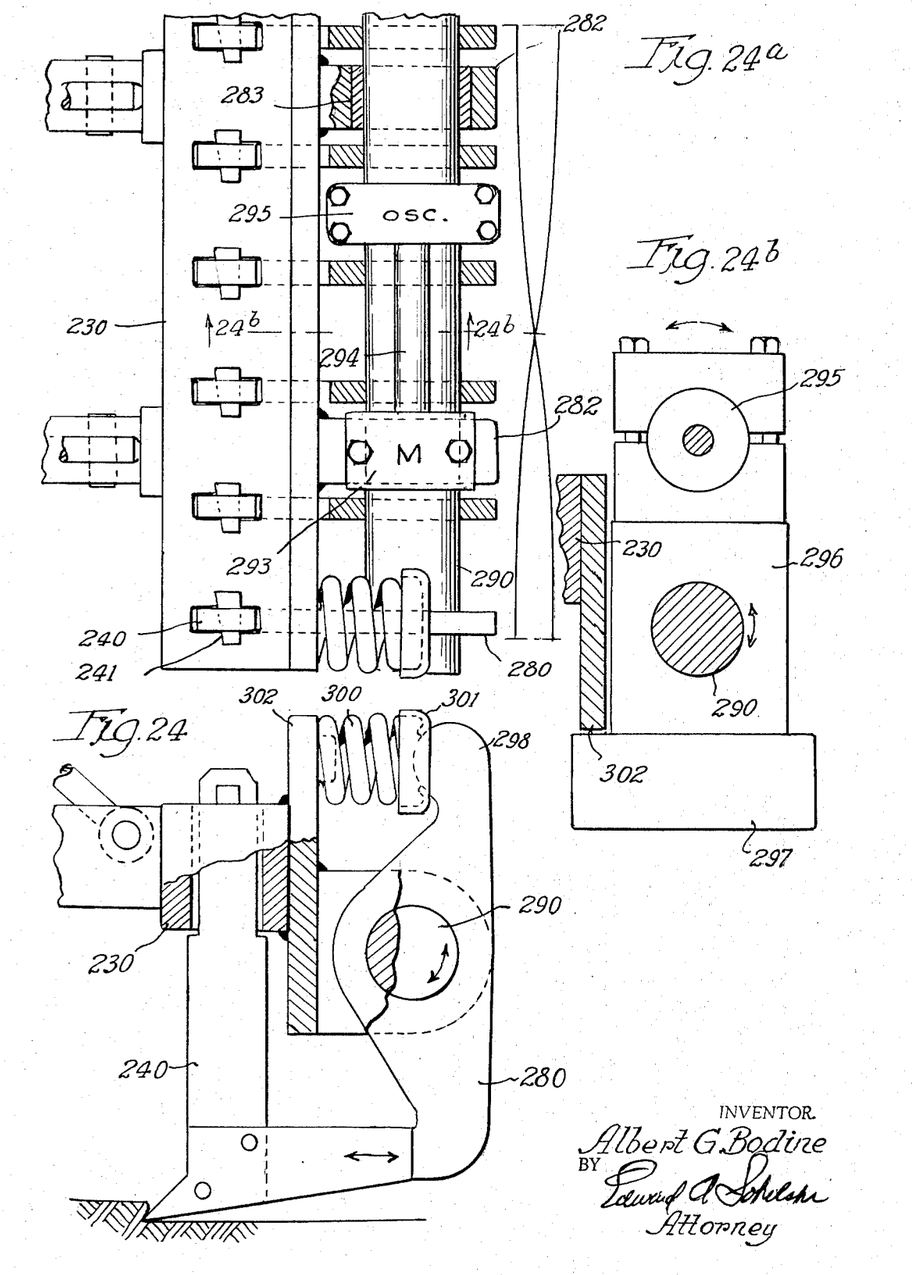
FIGS. 24, 24a and 24b are various views of another embodiment of the invention as incorporated into a ripper-scarifier for use in mud work.

FIGS. 24, 24a and 24b show a further embodiment of the invention for use in a ripper-scarifier in which the resonant bar is a torsional bar. The vehicle utilized with this embodiment may be of the type shown in FIG. 23. Referring particularly to FIG. 24, we note that the tool bar 230 is mounted as in the embodiment of FIG. 23, the individual cutter teeth 240 being mounted for freedom of vibratory motion as indicated. Teeth 240 are retained in their loose sockets, by taper pins 241. In the embodiment of FIG. 24, the individual cutter teeth 240 are each driven by an individual rocker arm 280, depending from resonant elastic torsion bar 290. The elastic torsion bar is mounted to the main tool bar 230 by trunnion units 282. These trunnion units have bushings 283 pressed therein, which provide freedom of rotary motion for the torsion bar 290, by virtue of the regular bearing clearance between bar 290 and bushings 283. It can be seen then that trunnions 282 fully determine the location of elastic torsion bar 290, while at the same time providing freedom of motion of torsional elastic vibration of said bar. The bar 290 is vibrationally driven by means of oscillator 295, which is connected to elastic bar 290 by means of large mounting plate 296. Oscillator 295 is rotatably driven by means of motor 293 via drive shaft 294. Mounting plate 296 is shrunk fitted to resonant bar 290 so as not to cause fatigue stress at the attachment. Counterweight 297, bolted to mounting plate 296, counterbalances the mass of oscillator 295, so that the combined structure is balanced about the center axis of the elastic bar 290. In this connection it will be noted that counterweights 298 are also formed on the upper ends of rocker arms 280, so as to provide dynamic balance for said rocker arms. In addition it will be noted that rocker arms 280 are also shrunk fitted to torsion bar 290, for the above mentioned reasons. As regards oscillator 295, drive shaft 294 and hydraulic motor 293, reference is again made to Patent No. 3,269,039, for details thereof. It will be noted that motor 293 is mounted on tool bar 230, as shown.

It will also be noted that forward bias is provided by trunnions 282 which carry torsion bar 290. In addition, to prevent back rotation of the torsion bar, spring 300 is mounted to react against one of the counterweights 298, by means of bracket 301, and by means of back reaction bracket 302 mounted on tool bar 230. Therefore as the vehicle progresses forward, the bias force is delivered against the back edge of the scarifier teeth, by the forward biasing of rocker arms 280. As described above the forward biasing of rocker arms 280 results from the combined urging of trunnions 282 and spring 300, which deliver the tractive effort via elastic bar 290. In operation torsional oscillations of the torsionally resonant bar cause rocker arms 280 to rock about a segment of an arc, so as to apply rectified sonic energy to the back edge of the scarifier teeth 240.

The primary advantage of this torsion bar form of the invention is that the torsion bar can be mounted considerably above the street level, so that the rocker arms are the only downward projecting element. Since these rocker arms can be narrow as shown, they can be accommodated in the grooves cut by the scarifier teeth 240, with consequent lack of contact and interference with other surfaces in the street as the tooth is cutting. In addition, the torsion bar has further advantage in that the rocker arm functions essentially as a lever, such that the lower tip thereof, which works against the scarifier tooth, can move with substantial amplitude, for a given amount of elastic stress in the torsion bar. This then results in a very high activity level for the acoustic rectifier device, wherein the acoustic rectifier device can have a large amplitude of motion.

It is important to note that most of the embodiments of this invention, with the exception of some particular forms such as that of FIG. 14, are arranged so that the bit member is separately carried on the vehicle, separate from the resonant member which latter is also individually mounted on the vehicle. The important feature of the invention here is that vertical loads and lateral loads, in fact all loads except along the axis of the bit, are taken by the mounting of the rectifier unit, thus isolating the resonant member from these various tractor loads. This means that the resonant member need only be properly positioned and supported as of its own weight, and in some cases providing only forward bias in addition, so that the vehicle loads do not cause load stresses in the mounting means for the resonant member.

It is to be noted that in all of the embodiments of the invention the coupler unit is made readily removable so as to facilitate replacement of the bit. It is also to be noted that the coupler unit should be made to have a low "Q" and a low natural vibration frequency such that the bit does not vibrate secondarily by shock excitation.

The technique and apparatus of this invention thus provide highly effective means for lessening wear and improving the efficiency of the operation of a sonically driven rock cutter. By utilizing a sonic rectifier to couple the sonic energy from a resonant vibration member to the cutting bit, sharp unidirectional pulses are transmitted to such bit which do the required work effectively and reverse movement of the bit with its deleterious effect on the bit and waste of energy is eliminated.

While the technique and apparatus of this invention have been described and illustrated in detail, it is to be clearly understood that this is intended by way of illustration and example only and is not to be taken by way of limitation, the spirit and scope of this invention being limited only by the terms of the following claims.

I claim:
1. A cutting apparatus for cutting hard material comprising:
   a resonant vibration system;
   sonic oscillator means coupled to said resonant vibration system to cause resonant vibration thereof;
   a cutter bit; and
   acoustic rectifier means for coupling only unidirectional pulses of sonic energy from said vibration system to said cutter bit.

2. The device of claim 1 wherein said acoustic rectifier means comprises a drive member, means for guiding and supporting said drive member, means for causing said resonant vibration system to be coupled to said drive member during vibration excursions towards said bit and uncoupled from said drive member during vibration excursions away from said bit.

3. The device of claim 1 wherein said resonant vibration system comprises an elastic bar interconnecting said rectifier means and said sonic oscillator means.

4. The device of claim 1 wherein said sonic oscillator means comprises an orbiting-mass oscillator.

5. The device of claim 1 wherein said acoustic rectifier comprises a drive member attached to said resonant vibration system and additionally including spring means for urging said drive member away from said cutter bit.

6. The device of claim 2 wherein said resonant vibration system comprises an elastic bar, said bit being attached to one end of said drive member, means for supporting said bar, said means for causing said vibration system to be coupled including spring means for urging said bar against the end of said drive member opposite the bit-attached end thereof and in a direction towards said bit.

7. The device of claim 1 wherein said resonant vibration system comprises an elongated elastic bar, said acoustic rectifier means comprising a drive member, said bit being attached to one end of said drive member, means for slidably supporting said drive member, and means for fixedly supporting said bar with one end thereof adjacent to the other end of said drive member, said sonic oscillator means being coupled to said bar to cause longitudinal elastic vibration thereof.

8. The device of claim 6 wherein said means for supporting said bar includes means for pivotally supporting said bar near one end thereof, a portion of said bar near the other end thereof abutting against said drive member, said oscillator being coupled to said bar to cause vibration thereof in directions toward and away from said bit.

9. The device of claim 6 and additionally including vehicle means for supporting said bar-supporting means and said drive member supporting means and means for imparting a forward thrust to said vehicle to drive said bit into a rock formation to be cut.

10. The device of claim 2 wherein said drive member comprises a shaft, one end of said shaft being attached to said bit, said drive member support means comprising a sleeve bearing.

11. The device of claim 1 wherein said acoustic rectifier means includes pin means for loosely coupling said bit to said vibration system.

12. A method for cutting hard material comprising:
   engaging the material with a cutter bit;
   coupling the output of a sonic generator to an elastic vibration system, said output being at a frequency such as to cause resonant elastic vibration of said system;
   urging said bit against the material with a high bias force; and
   while said bit is being urged against said material coupling a unidirectional portion of the vibrational output of said vibration system in the general direction in which said bit is being biased against said material.

13. A sonically vibratory rock cutting machine comprising:
- a power motivated vehicle having a forward thrust;
- an elastic bar mounted on said vehicle;
- a sonic vibration oscillator mounted on and acoustically coupled to said bar so as to set up resonant elastic vibration thereof;
- a cutter bit;
- means for supporting said cutter bit on said vehicle so that it is directed in the general direction of said forward thrust; and
- acoustic rectifier means for coupling only unidirectional phases of sonic energy from said bar to said cutter bit.

14. The machine as recited in claim 13 wherein said rectifier means comprises a shaft member attached at one end thereof to said bit, means for slidably supporting said shaft member, and means for resiliently urging a portion of said bar against the end of said shaft member opposite said one end thereof.

15. The machine as recited in claim 13 wherein said rectifier means comprises a drive member attached to said elastic bar, said means for supporting said cutter bit including means for supporting said drive member for slidable motion relative to said bit, and spring means for urging said drive member and said bit away from each other.

16. The machine as recited in claim 13 wherein said acoustic rectifier means includes spring means for coupling said bar to said cutter bit during a fixed portion of each vibration cycle.

17. The machine as recited in claim 13 wherein said acoustic rectifier means includes means for automatically varying the degree of coupling between said bar and said cutter bit in accordance with the bias force imparted to the cutter bit as said vehicle is motivated.

18. The machine as recited in claim 13 wherein said rectifier means comprises a shaft member attached at one end thereof to said bit and means for pivotally supporting said shaft member on said vehicle.

19. The machine as recited in claim 13 wherein said cutter bit includes a plurality of tooth members, said bit supporting means including means for loosely mounting said tooth members, said bar extending along the back portions of said tooth members, said acoustic rectifier including spring means for urging said bar against the back portions of said tooth members.

20. The machine as recited in claim 13 wherein said bar comprises a torsion bar member, said means for supporting said cutter bit and for coupling sonic energy from said bar to said bit comprising rocker arm means connected between said torsion bar and said cutter bit.

References Cited
UNITED STATES PATENTS

| | | |
|---|---|---|
| 2,443,492 | 6/1948 | Austin. |
| 3,030,087 | 4/1962 | Herrmann _________ 299—14 X |
| 3,291,224 | 12/1966 | Stutz _____________ 173—49 |

ERNEST R. PURSER, *Primary Examiner.*